United States Patent [19]

Maeda

[11] 3,858,865

[45] Jan. 7, 1975

[54] APPARATUS FOR ALIGNING WELDING JOINTS

[75] Inventor: Kazuo Maeda, Chiba, Japan

[73] Assignee: Mitsui Shipbuilding and Engineering Co. Ltd., Chuoku, Tokyo, Japan

[22] Filed: Feb. 23, 1973

[21] Appl. No.: 335,249

[52] U.S. Cl............ 269/25, 219/126, 228/45, 269/37, 269/55
[51] Int. Cl............................................ B23k 37/04
[58] Field of Search.. 219/101, 102, 125 R, 125 PL, 219/126; 228/4, 44, 45; 269/20, 25, 27, 37, 50, 55

[56] References Cited
UNITED STATES PATENTS
1,827,258   10/1931   Payzant................................ 269/25
FOREIGN PATENTS OR APPLICATIONS
6,703,405   9/1968   Netherlands....................... 219/126
1,515,286   3/1970   Germany............................ 219/126
1,536,187   8/1968   France................................. 219/126

Primary Examiner—Roy Lake
Assistant Examiner—Mark S. Bicks
Attorney, Agent, or Firm—Howson & Howson

[57] ABSTRACT

Apparatus for reforming non-aligned edges of plates prior to their being butt welded together comprises a frame having a front portion adapted to move along one side of the plates, a rear portion adapted to move along the other side and roller means for applying pressure therebetween. The frame portions are connected together by elements which extend through a gap between the edges of the plates. Roller groupings are mounted in tandem in the front and rear portions for engaging edge margins of the plates along the gap, and there is provided means to urge the rollers toward one another under pressure, so that when the frame is advanced along the gap, non-aligned edges of the plates are aligned with one another.

2 Claims, 3 Drawing Figures

PATENTED JAN 7 1975

3,858,865

APPARATUS FOR ALIGNING WELDING JOINTS

The present invention relates to an apparatus for aligning welding joints of the large-sized structures such as hull modules used in shipbuilding.

An object of the present invention is to provide an apparatus for fitting the joints of plates into precise alignment prior to the welding thereof.

The welding joints aligning apparatus according to the present invention is characterized by provision of front and back side aligning rollers disposed to span both adjoining plates to be welded, and hydraulic cylinder means adapted to draw said front and back side rollers toward each other.

Figure 1:
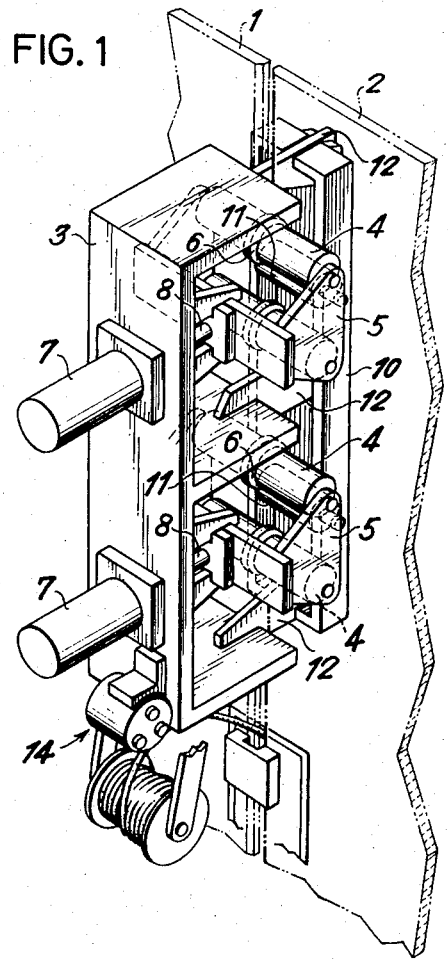
FIG. 1 is a perspective view of the apparatus according to the present invention.
Figure 2:
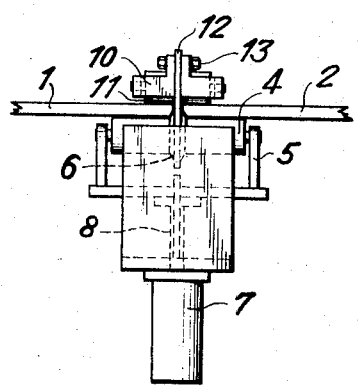
FIG. 2 is a plane view thereof.
Figure 3:
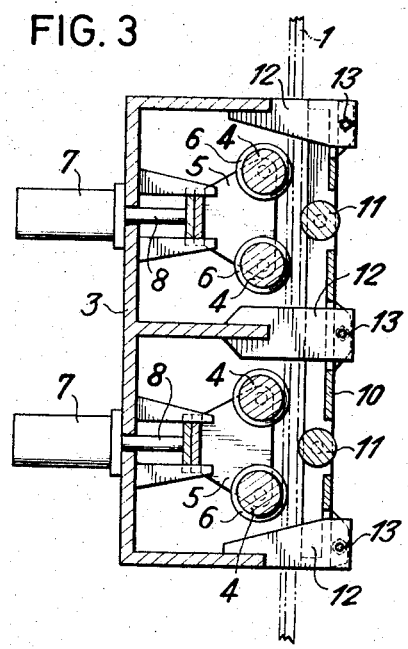
FIG. 3 is a vertical sectional view of the same.

The apparatus is now described in detail with reference to the drawings.

In the drawings, numerals 1 and 2 denote the shell plates of the hull modules to be welded together. Frame 3 contains therein two pairs of press rollers 4 each having a length sufficient to span both shell plates to be welded together, each pair of the rollers being supported by a frame member 5. Each of rollers has a flange 6 at its middle part which engages with the bevel to be welded. Secured to the backside of each frame member 5 is an end of the piston rod 8 of each hydraulic cylinder 7 secured to the frame 3. A rear frame 10 is adapted to be disposed on the backside of the plates for movement thereon, and the rear frame 10 mounts a pair of rollers 11 each of which is mounted intermediate and opposite its associated pair of rollers 4.

Also provided in the frame 3 are connecting plates 12 passing through the bevel and to the backside frame 10. These connecting plates are secured to the frame 10 by bolts 13. In this condition, pressured oil is supplied to the respective hydraulic cylinders 7 to push the pistons, whereby the press rollers 4 are pressed against the shell plates 1 and 2 while the backside frame 10 is also drawn toward the plates through the connecting plates 12 and hence the press rollers 11 are also urged to the shell plates. Under this situation, if the frame 3 is vertically moved along the bevel by a suitable means, edges of both shell plates 1 and 2 are bent to be brought into welding alignment. In the frame 3 is also mounted a welding machine 14 to perform welding simultaneously with movement of the frame.

As apparent from the foregoing description, it is possible according to the present apparatus to correct the edges of plates to be welded with ease.

What is claimed is:

1. Apparatus for aligning edges of plates spaced apart edgewise by a gap and having non-aligned portions, comprising:

a frame having a front portion adapted to be disposed on one side of said plates and a rear portion adapted to be disposed on the other side of said plates;

means including a pair of connecting elements adapted to extend through said gap for rigidly connecting together said front and rear portions of said frame;

a roller assembly associated with the front portion of said frame, said roller assembly including a pair of rollers mounted in spaced relation to the direction of movement of said frame and adapted to span across said gap for engaging edge margins of said plates on said one side;

at least one roller associated with said pair of rollers and carried by the rear portion of said frame, said one roller adapted to span across said gap for engaging edge margins of said plates on the other side thereof, said one roller being located intermediate said pair of rollers;

expansible-chamber actuator means mounting said roller assembly in said front frame portion for adjustable movement transversely to the path of movement of said frame;

said front portion of said frame overlying said roller assembly and said actuator means being connected to said overlying front frame for applying substantial pressure between said overlaying front frame and said roller assembly to cause said front portion of said frame to cooperate with said connecting elements to cause said rollers to apply an edge-reforming pressure against opposite sides of said plates;

whereby movement of the frame in a path along the gap causes non-aligned portions of the plate edges to be bent about the rollers into alignment with one another.

2. Apparatus according to claim 1 including another roller and roller assembly associated with said frame in a manner similar to said first-mentioned roller and roller assembly, said first and second mentioned rollers and roller assemblies being mounted in tandem in spaced relation in the path of movement of said frame, and including separate actuator means for each roller assembly to displace the same independently of one another relative to the front portion of the frame, so that different rolling pressures may be applied to the edge margins of the plates as the frame advances to subject the plates to a double rolling action.